United States Patent
Don et al.

(10) Patent No.: US 12,212,656 B2
(45) Date of Patent: Jan. 28, 2025

(54) REMOTE REPLICATION WITH HOST ENCRYPTION

(71) Applicant: EMC IP Holding Company LLC, Hopkinton, MA (US)

(72) Inventors: Arieh Don, Newton, MA (US); Tomer Shachar, Omer (IL); Maxim Balin, Gan-Yavne (IL); Yevgeni Gehtman, Modi'in (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 322 days.

(21) Appl. No.: 17/237,749

(22) Filed: Apr. 22, 2021

(65) Prior Publication Data

US 2022/0345295 A1 Oct. 27, 2022

(51) Int. Cl.
*H04L 9/08* (2006.01)
*G06F 16/27* (2019.01)
*G06F 21/60* (2013.01)

(52) U.S. Cl.
CPC ............ *H04L 9/0819* (2013.01); *G06F 16/27* (2019.01); *G06F 21/602* (2013.01)

(58) Field of Classification Search
CPC ....... H04L 9/0819; G06F 16/27; G06F 21/602
See application file for complete search history.

(56) References Cited

U.S. PATENT DOCUMENTS

| | | | |
|---|---|---|---|
| 11,108,550 B1* | 8/2021 | Esbensen | G06F 21/80 |
| 2007/0136606 A1* | 6/2007 | Mizuno | H04L 9/0894 |
| | | | 713/192 |
| 2016/0078245 A1* | 3/2016 | Amarendran | G06N 20/00 |
| | | | 713/193 |
| 2017/0316075 A1* | 11/2017 | Deshmukh | H04L 67/1095 |
| 2021/0173945 A1* | 6/2021 | Karr | G06F 3/0622 |

\* cited by examiner

*Primary Examiner* — Alexander Lagor
*Assistant Examiner* — Zoha Piyadehghibi Tafaghodi
(74) *Attorney, Agent, or Firm* — Muirhead and Saturnelli, LLC (57) ABSTRACT

Decrypting data at a first storage system that has been encrypted at a second, separate, storage system includes the first storage system requesting a key that decrypts the data from the second storage system, the second storage system determining if the first storage system is authorized for the key, the second storage system providing the key to the first storage system in response to the first storage system being authorized, a host that is coupled to the first storage system obtaining the key from the first storage system, and the host using the key to decrypt and access the data at the first storage system. The host and the first storage system may provide failover functionality for a system that includes the second storage system. The host may obtain the key from the first storage system in response to a failure of the system that includes the second storage system.

20 Claims, 7 Drawing Sheets

REMOTE REPLICATION WITH HOST ENCRYPTION

TECHNICAL FIELD

This application relates to the field of computer systems and storage systems therefor and, more particularly, to the field of accessing encrypted data at storage system.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units or logical devices. The logical devices may or may not correspond to any one of the actual disk drives. Allowing multiple host systems to access the single storage system allows the host systems to share data stored therein among different host processor systems.

In some instances, it may be desirable to encrypt data at a storage system to prevent unauthorized access to the data. The data may be encrypted using a symmetric encryption key, where the same key is used for both encryption and decryption, or may be encryption using asymmetric encryption, where keys used for encryption and decryption are different. In either case, the goal is to make the data unreadable by anyone that does not have the decryption key. Thus, a malicious actor that gains access to the encrypted data still cannot decrypt the data without the appropriate decryption key. Needless to say, it is important to prevent unauthorized access to the decryption key.

It is also useful to replicate data from one storage system to another to provide failover capability so that if a primary system fails, a corresponding failover system can take over execution of production tasks. Replicating encrypted data presents challenges, however, in connection with replicating data for failover capabilities. In many cases, host systems maintain keys used for accessing encrypted data. However, in the case of a failover, a primary host system may not be available. One way to address this would be to decrypt the data prior to transferring the data from a primary storage system to a failover storage system. However, the decryption process may use significant processing resources of the primary storage system and would require that the data be encrypted again at the failover storage system. Moreover, decrypting the data prior to transmission makes the data vulnerable to the type of unauthorized access that encryption was meant to prevent. Another possibility is to make keys used for decryption generally available to applications in the system. However, this too may make the encrypted data vulnerable to unauthorized access.

Accordingly, it is desirable to be able to provide a mechanism that maintains data in an encrypted state, but allows a failover system to access the encrypted data without jeopardizing security of the data.

SUMMARY OF THE INVENTION

According to the system described herein, decrypting data at a first storage system that has been encrypted at a second, separate, storage system includes the first storage system requesting a key that decrypts the data from the second storage system, the second storage system determining if the first storage system is authorized for the key, the second storage system providing the key to the first storage system in response to the first storage system being authorized, a host that is coupled to the first storage system obtaining the key from the first storage system, and the host using the key to decrypt and access the data at the first storage system. The host and the first storage system may provide failover functionality for a system that includes the second storage system. The host may obtain the key from the first storage system in response to a failure of the system that includes the second storage system. Authorization may be determined according to a manual configuration at a time of installation. Authorization may be determined according to heuristic rules. The heuristic rules may include providing authorization storage systems that contain a replica of encrypted data from another storage system. The first and the second storage systems may share registration tables.

According further to the system described herein, non-transitory computer readable media contains software that decrypts data at a first storage system that has been encrypted at a second, separate, storage system. The software includes executable code at the first storage system that requests a key that decrypts the data from the second storage system, executable code at the second storage system that determines if the first storage system is authorized for the key, executable code at the second storage system that provides the key to the first storage system in response to the first storage system being authorized, executable code at a host that is coupled to the first storage system and that obtains the key from the first storage system, and executable code at the host that uses the key to decrypt and access the data at the first storage system. The host and the first storage system may provide failover functionality for a system that includes the second storage system. The host may obtain the key from the first storage system in response to a failure of the system that includes the second storage system. Authorization may be determined according to a manual configuration at a time of installation. Authorization may be determined according to heuristic rules. The heuristic rules may include providing authorization storage systems that contain a replica of encrypted data from another storage system. The first and the second storage systems may share registration tables.

According further to the system described herein, a system that provides failover capability includes a first host coupled to a first storage system to exchange encrypted data therewith, the data being decryptable using a key and a second host coupled to a second storage system. The first and second storage systems are coupled and the second storage system receives the encrypted data from the first storage system. The second storage system and second host provide failover support for the first storage system and first host. The second storage system receives the key from the first storage system prior to a failure and then provides the key to the second host following a failure. The first storage system may determine whether the second storage system is authorized prior to providing the key to the second storage system. Authorization may be determined according to a manual configuration at a time of installation. Authorization may be determined according to heuristic rules. The heuristic rules may include providing authorization storage systems that contain a replica of encrypted data from another storage system. The first and the second storage systems may share registration tables.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism for securely distributing encryption keys so that replicated encrypted data may be accessed at a failover system after the encryption key is no longer accessible at the failed corresponding primary system.

Figure 1:
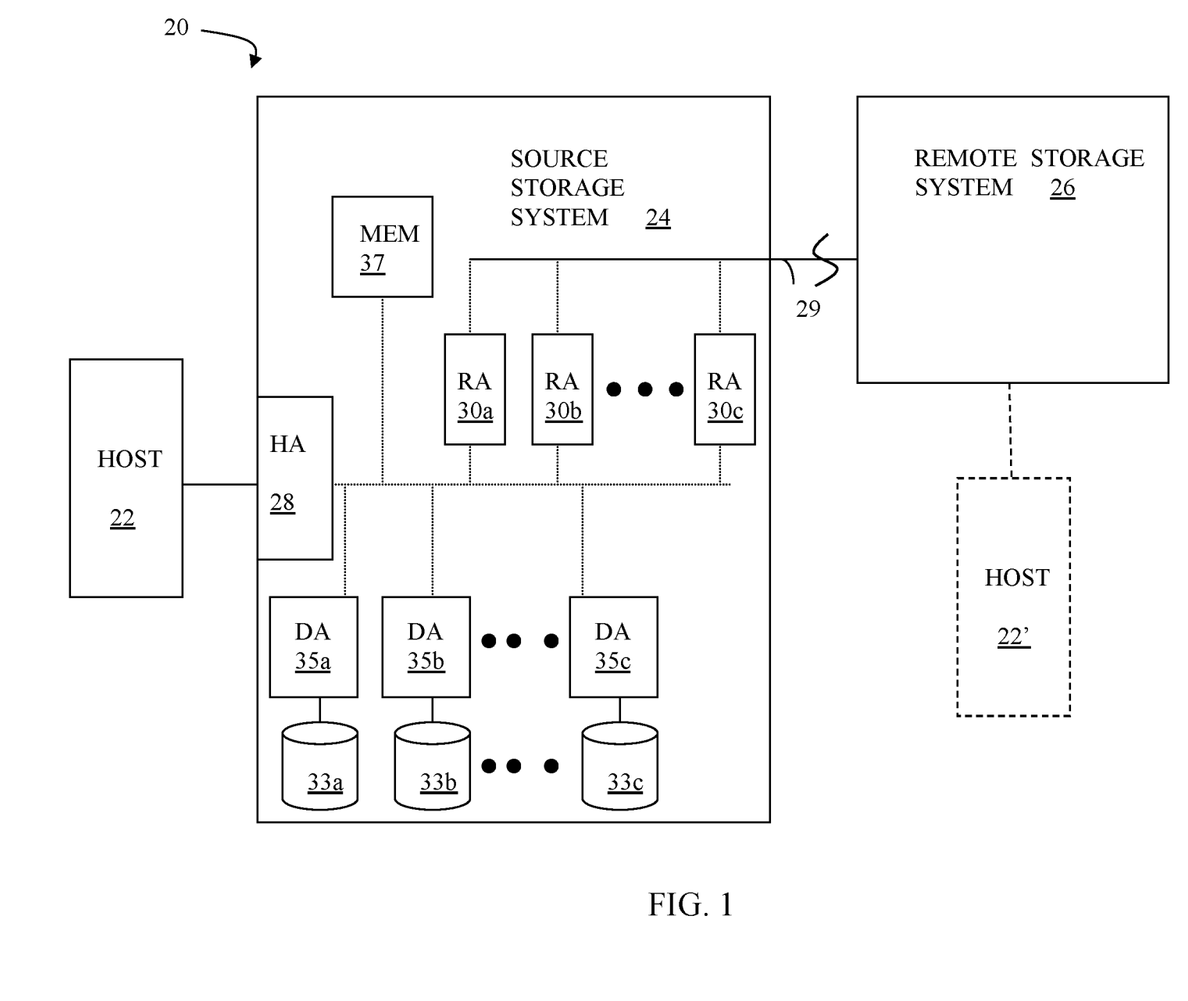
FIG. 1 is a schematic illustration showing a relationship between hosts and storage systems according to an embodiment of the system described herein.

FIG. 1 is a diagram 20 showing a relationship between a host 22 and a source storage system 24 that may be used in connection with an embodiment of the system described herein. In an embodiment, the source storage system 24 may be a PowerMax, Symmetrix, or VMAX storage system produced by Dell EMC of Hopkinton, Massachusetts; however, the system described herein may operate with other appropriate types of storage systems. Also illustrated is another (remote) storage system 26 that may be similar to, or different from, the source storage system 24 and may, in various embodiments, be coupled to the source storage system 24, using, for example, a network. The host 22 reads and writes data from and to the source storage system 24 via an HA 28 (host adapter), which facilitates an interface between the host 22 and the source storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the source storage system 24 may be copied to the remote storage system 26 via a link 29. For example, transferring data may be part of a data mirroring or replication process that causes data on the remote storage system 26 to be identical to the data on the remote storage system 24. Although only the one link 29 is shown, it is possible to have additional links between the storage systems 24, 26 and to have links between one or both of the storage systems 24, 26 and other storage systems (not shown). The source storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The source storage system 24 may include one or more physical storage units (including disks, solid state storage devices, etc.), each containing a different portion of data stored on the source storage system 24. FIG. 1 shows the source storage system 24 having a plurality of physical storage units 33a-33c. The source storage system 24 (and/or remote storage system 26) may be provided as a stand-alone device coupled to the host 22 as shown in FIG. 1 or, alternatively, the source storage system 24 (and/or remote storage system 26) may be part of a storage area network (SAN) that includes a plurality of other storage systems as well as routers, network connections, etc. (not shown in FIG. 1). The storage systems 24, 26 may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the source storage system 24. Note that, in other embodiments, it is possible for more than one physical storage unit to be serviced by a DA and that it is possible for more than one DA to service a physical storage unit. The source storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the source storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the source storage system 24, operation may resume at a remote site containing the remote storage system 26 and the other host 22'. In some cases, the host 22 may be directly coupled to the remote storage system 26, thus protecting from failure of the source storage system 24 without necessarily protecting from failure of the host 22.

Figure 2:
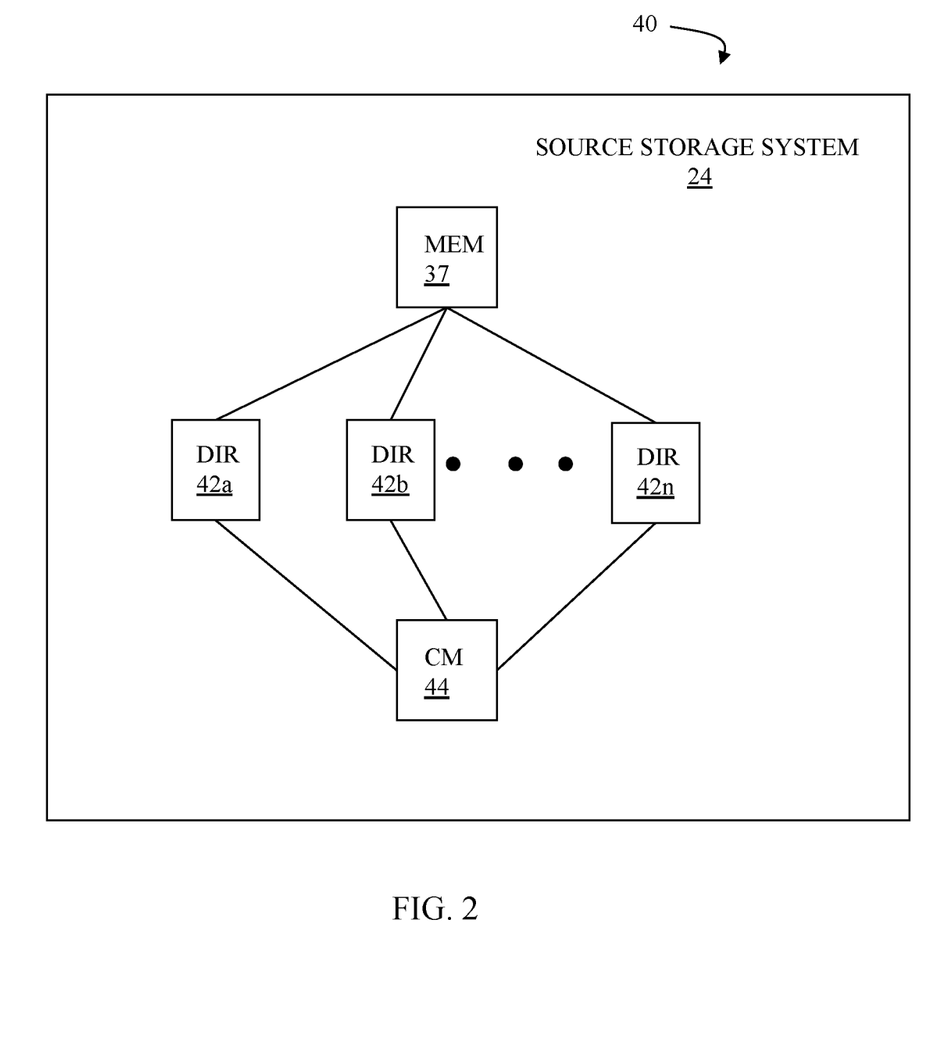
FIG. 2 is a schematic diagram illustrating a storage system where each of a plurality of directors are coupled to a memory according to an embodiment of the system described herein.

FIG. 2 is a schematic diagram 40 illustrating an embodiment of the source storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the source storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
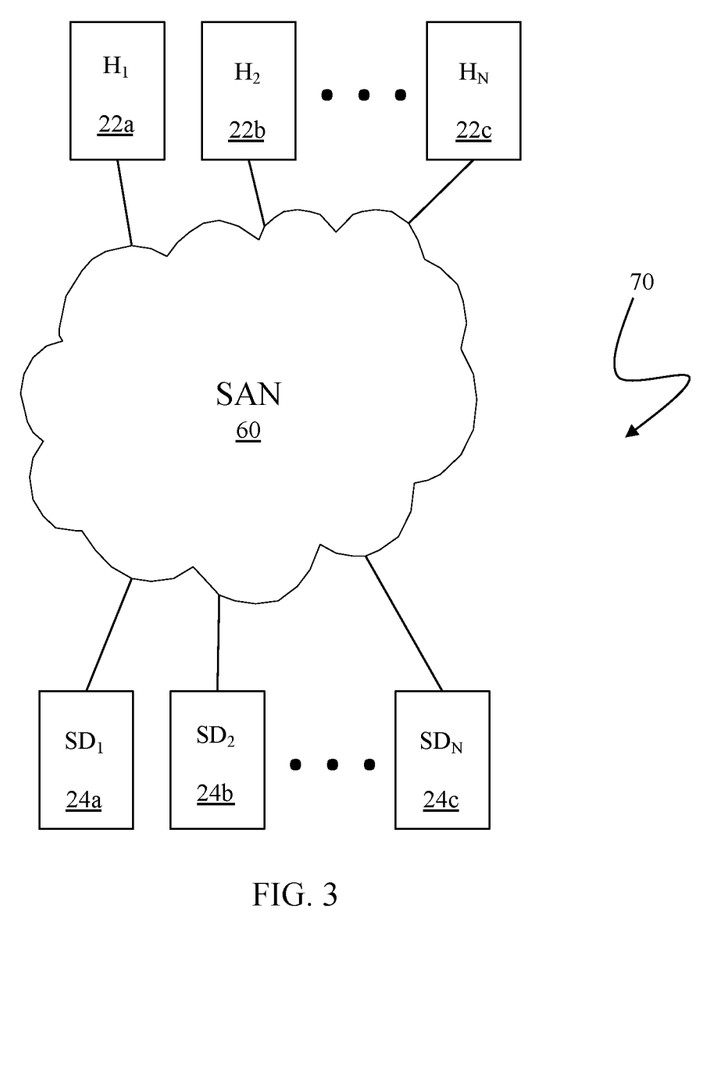
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
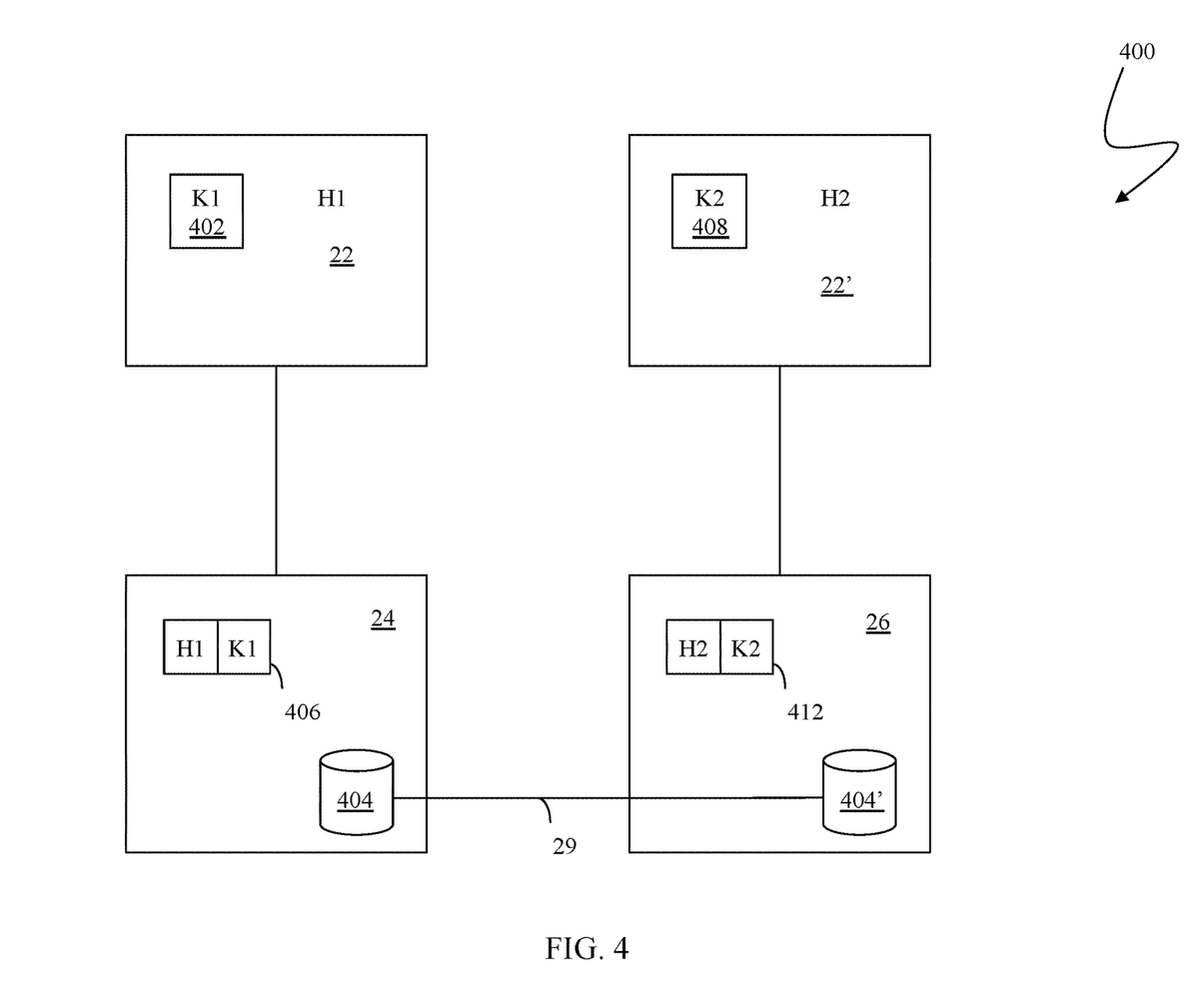
FIG. 4 is a schematic illustration showing a relationship between hosts and storage systems using encryption keys according to an embodiment of the system described herein.

Referring to FIG. 4, a diagram 400 shows the hosts 22, 22', which are discussed above, where the host 22 is coupled to and exchanges data with the storage system 24 while the host 22' is coupled to and exchanges data with the storage system 26. Data from the storage system 24 may be replicated to the storage system 26 via the link 29 or any other appropriate mechanism, such as via the Internet. The storage systems 22, 24 and the link 29 are discussed above. The host 22 is shown as including a cryptography key 402 that may be used for encrypting non-volatile encrypted data 404 prior to storing the data on the storage system 24. In some embodiments, the cryptography key 402 may be a symmetric key that is used for both encryption and decryption of data on the storage system 24. In other embodiments, the cryptography key 402 may be a private key of a public/private asymmetric key pair where a public key (not shown) is used for encrypting the encrypted data 404 that is stored on the storage system 24 and the cryptography key 402 is a corresponding private key that is used for decrypting the encrypted data 404 that is stored on the storage system 24. In either case (symmetric or asymmetric encryption), data is encrypted by the host system 22 prior to being written to the storage system 24 and the host system 22 decrypts data that is read from the storage system 24.

The non-volatile encrypted data 404 may be maintained in an encrypted state at all times (encryption at rest), even when there is no electrical power applied being applied to the storage system 24. Thus, if physical storage hardware components from the storage system 24 were to be accessed by a malicious actor, the data thereon would be encrypted and thus inaccessible by the malicious actor. The malicious actor would need the encryption key 402 in order to be able to decrypt the encrypted data 404. Thus, securely maintaining the encryption key 402 is important in preventing unauthorized access to the encrypted data 404. The storage system 24 includes an encryption table 406 that securely stores a plurality encryption keys used by the host 22, including the encryption key 402. In some instances, the encryption table 406 may also be encrypted with a different key (not shown) that is not part of the storage system 24 but may, instead, by applied at power up (e.g., manually by an operator) or at other instances where the encryption table 406 needs to be accessed.

In an embodiment herein, the encrypted data 404 may be replicated to provide replicated encrypted data 404' on the storage system 26. The host 22' and the storage system 26 may use an encryption key 408 that is different from and unrelated to the encryption key 402 used by the host 22 and the storage system 24. The encryption key 408 may be stored in an encryption table 412, like the encryption table 406 discussed above, that securely stores a plurality encryption keys used by the host 22', including the encryption key 408. The encryption key 408 may be used to encrypt and decrypt native encrypted data (not shown) on the storage system 26 in instances where the data originates with the host 22'. However, the replicated encrypted data 404' originates with the host 22 and, moreover, the encryption keys 402, 408 are unrelated. Thus, the host 22' cannot access the replicated encrypted data 404' using the encryption key 408. In instances where the encrypted data 404 is being replicated from the storage system 24 to the storage system 26 to provide failover, having the replicated encrypted data 404' be inaccessible by the host 22' is unacceptable since a failover situation could include failure of both the host 22 and the storage system 24. If the host 22' is unable to access the replicated encrypted data 404', then the system cannot be restarted following a failover.

Figure 5:
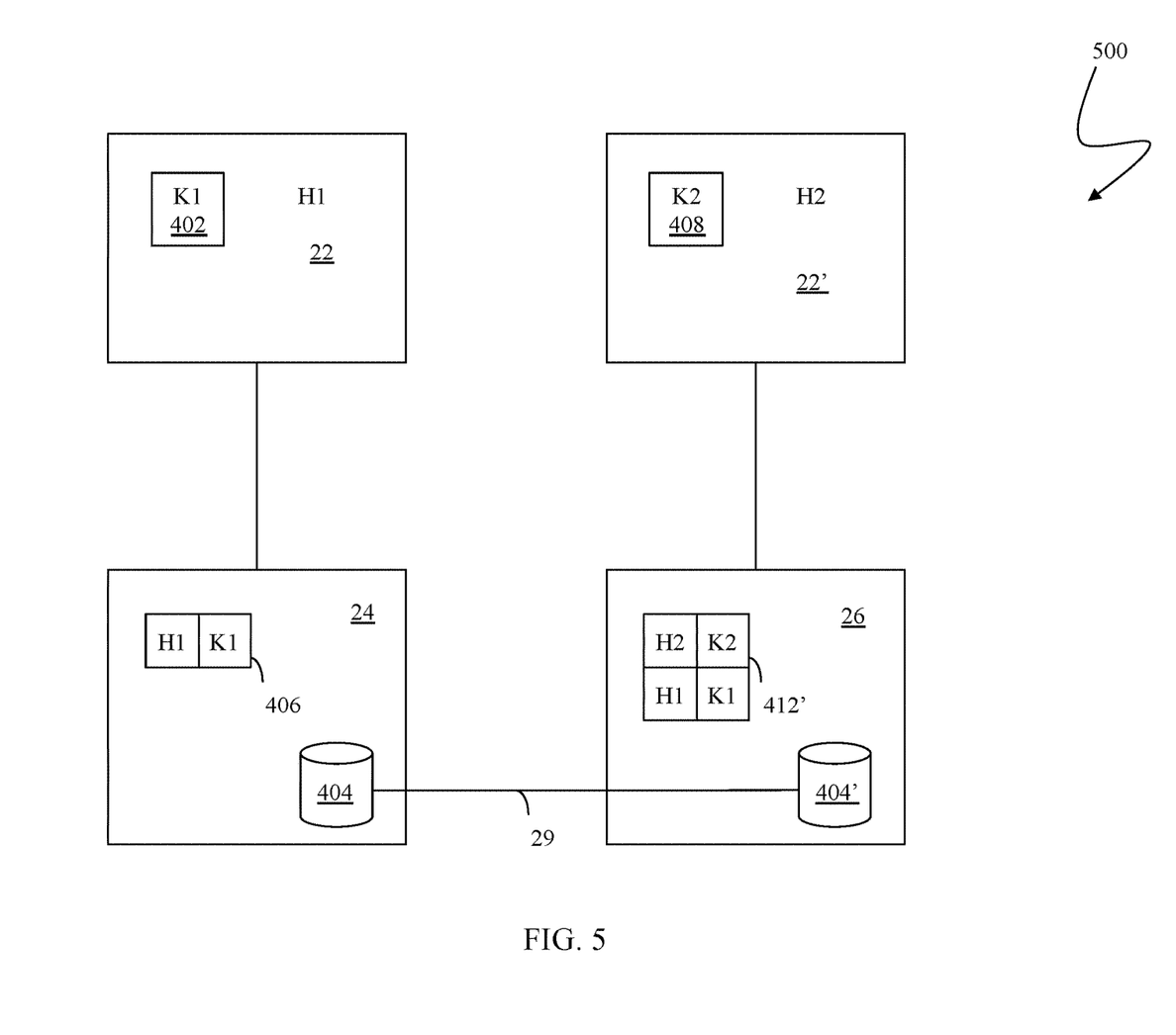
FIG. 5 is a schematic illustration showing a relationship between hosts and storage systems using encryption keys that are securely distributed according to an embodiment of the system described herein.

Referring to FIG. 5, a diagram 500 shows the system with components similar to components shown in the diagram 400, discussed above in connection with FIG. 4. However, in the case of the diagram 500, the storage system 26 is shown as including a supplemented encryption table 412' that includes the encryption key 408 that was provided with the encryption table 412, discussed above, and includes the encryption key 402 that is used in connection with encryption between the host 22 and the storage system 24, discussed above. Since the encryption key 402 may be used to access the replicated encrypted data 404', then the host 22' may access the replicated encrypted data 404' using the encryption key 402 from the supplemented encryption table 412'. In an embodiment herein, the host 22 and the storage system 24 may be primary components that are used to run production jobs and the host 22' and the storage system 26 may be failover components that are maintained in standby and are used to run production jobs upon failure of the primary components. Of course, it is also possible to have systems where the host 22 and the storage system 24 are primary components for some jobs and are failover components for other jobs for which other components (e.g., the host 22' and the storage system 26) are the primary components.

Figure 6:
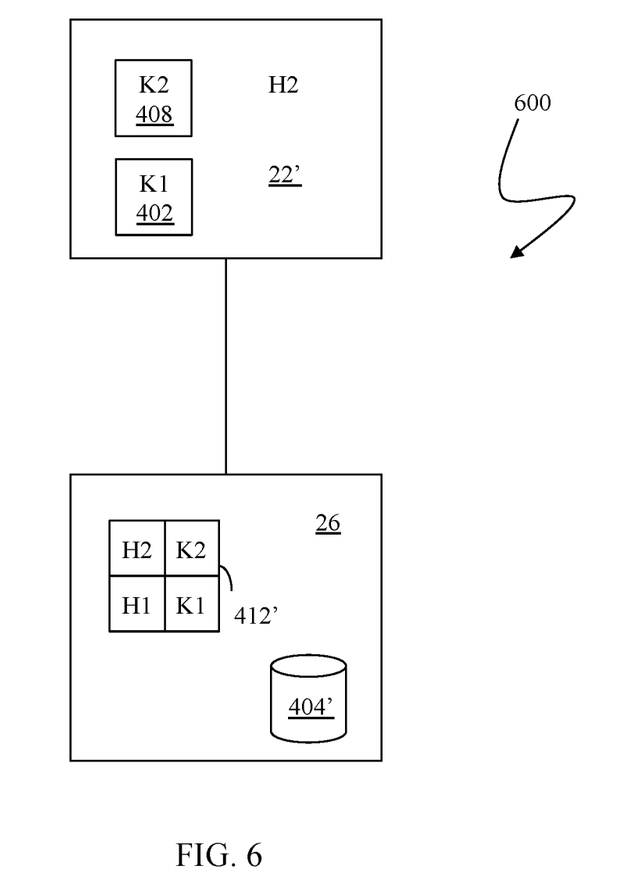
FIG. 6 is a schematic illustration showing a failover host and storage system accessing encrypted data using a securely distributed encryption key according to an embodiment of the system described herein.

Referring to FIG. 6, a diagram 600 illustrates the system in a state where a failover has occurred. The diagram 600 illustrates that only the host 22' and the storage system 26 are present, which are failover components that may be used following failure of primary components, as discussed elsewhere herein. In the example illustrated by FIGS. 4-6, the host 22 and the storage system 24 are the corresponding primary systems that have failed. The storage system 26 includes the supplemented encryption table 412', discussed elsewhere herein, that has an entry for the key 402 that may be used to access the replicated encrypted data 404'. In connection with a failover event, the host 22' may request that the storage system 26 provide the encryption key 402 so that the host 22' can access the replicated encrypted data 404' to run the production jobs that were run on the primary system prior to the failover event.

Figure 7:
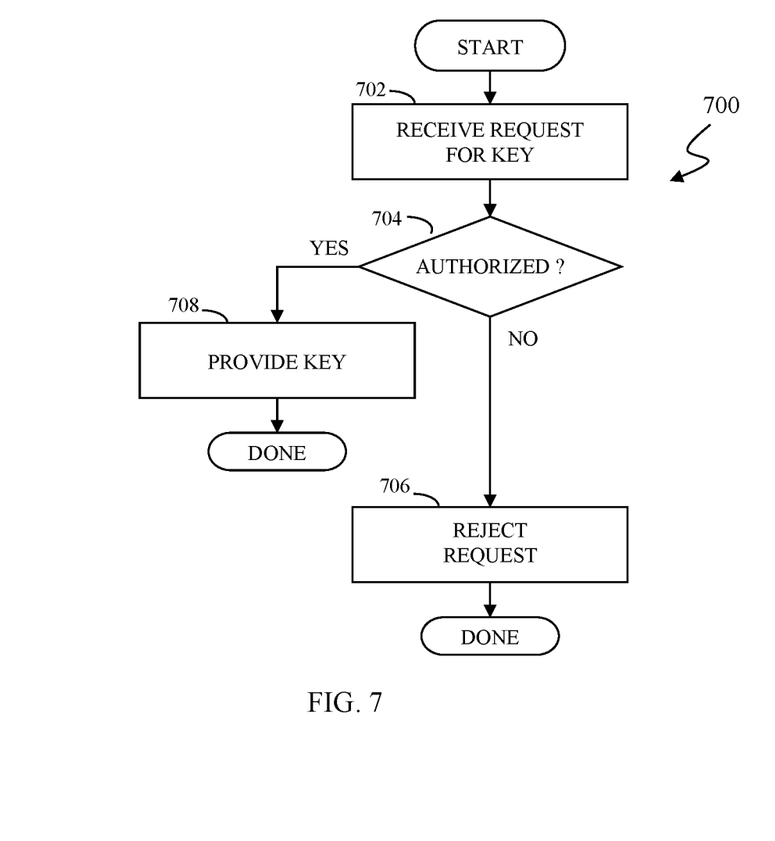
FIG. 7 is a flow diagram illustrating processing performed in connection securely distributing encryption keys according to an embodiment of the system described herein.

Referring to FIG. 7, a flow diagram 700 illustrates processing performed by a primary storage system (e.g., the storage system 24) in connection with providing, to a failover storage system, a key used for encryption at the primary storage system. Note that it is important to restrict the distribution of encryption keys to maintain proper security. Thus, the system described herein restricts access to encryption keys so that only systems that could need to access the encrypted data receive keys. Moreover, the keys are maintained at the storage systems unless and until that are needed in connection with a failover event, as described in more detail elsewhere herein.

Processing for the flow diagram 700 begins at a first step 702 where a native storage system (e.g., a primary storage system) receives a request from a foreign storage system (e.g., the storage system 26) for a particular encryption key that is used by the local storage system and by one or more hosts coupled thereto in connection with accessing encrypted data at the native storage system. The foreign storage system may be any other storage system for which the particular encryption key is not native (did not originate), such as a corresponding failover storage system. Note, by the way, that the processing illustrated by the flow diagram 700 needs to be performed by the native storage system prior to failure of the native storage system. In some embodiments, the processing illustrated by the flow diagram may be performed by a foreign storage system as part of an overall initialization process. That is, upon initialization, the foreign storage system determines which encryption keys will be needed in case of a subsequent failover and then requests the encryption keys from appropriate other storage systems. Of course, waiting until after a failover to request any encryption keys is not possible because the failed storage system may not be operational and/or communication with the failed storage system may not be possible.

Following the step 702 is a test step 704 where it is determined if the foreign storage system is authorized to receive the requested encryption key. Note that the test at the step 704 may use any of a number of appropriate mechanisms for appropriately restricting access to native encryption keys. In some cases, authorization may be based on manual configuration at a time of installation. For example, the storage system 24 may be provided with a secure list of foreign storage systems, such as the storage system 26, that are authorized to receive particular native encryption keys. It is also possible to provide heuristic rules for authorization, such as providing authorization for all foreign storage systems that contain a replica of encrypted data stored on the native storage system. It some embodiments, the storage systems may share registration tables based on the primary/secondary relationship that has been established. Generally, whatever mechanism is used, the only foreign storage systems that are authorized to receive encryption keys from a native storage system are foreign storage systems that legitimately possesses encrypted data from the native storage system.

If it is determined at the test step 704 that the request for a particular encryption key is not authorized, then control transfers from the test step 704 to a step 706 where the request is refused (e.g., by returning a particular message to the requestor). Following the step 706, processing is complete. Otherwise, if it is determined at the test step 704 that the request for the particular encryption key is authorized, then control transfers from the test step 704 to a step 708 where the requested encryption key is provided. In an embodiment herein, the encryption key may be provided using any appropriate secure mechanism, such as being itself encrypted with a symmetric or asymmetric key so that the encryption key may only be accessed by the requesting foreign storage system. As discussed elsewhere herein, the foreign storage system may store the encryption key in a supplemented encryption table. Following the step 708, processing is complete.

Figure 8:
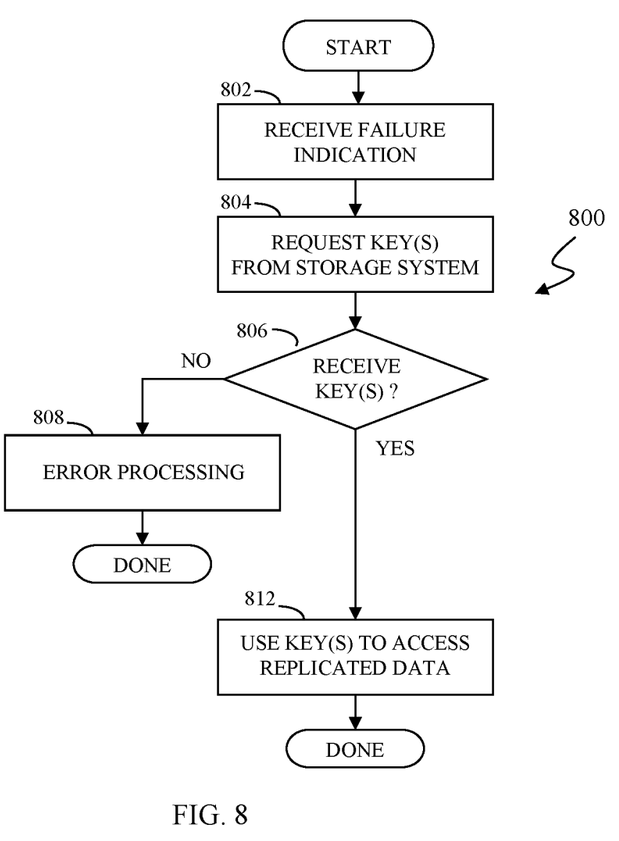
FIG. 8 is a flow diagram illustrating an application on a host of a failover system accessing a securely distributed encryption key according to an embodiment of the system described herein.

Referring to FIG. 8, a flow diagram 800 illustrates processing performed in connection with an application on a host running following a failover. For example, the processing illustrated by the flow diagram 800 may be by an application on the host 22' where the host 22' and the storage system 26 may provide failover functionality for the host 22 and the storage system 24 as illustrated by the diagram 600 of FIG. 6. Processing begins at a first step 802 where the application receives an indication (signal) that a failover has occurred. Following the step 802 is a step 804 where the application requests an appropriate foreign encryption key (e.g., the key 402, discussed above) from the storage system 26. As discussed elsewhere herein, the storage system 26 should have already received the foreign key from the storage system 24 and the foreign key should already be stored in an enhanced encryption table of the storage system 26.

Following the step 804 is a test step 806 where it is determined if the application has received the foreign encryption key from the storage system 26. If not, then control transfers from the step 806 to a step 808 where error processing is performed. Note generally that it is an error condition if the storage system 26 does not already have the foreign encryption key since the foreign encryption key should have been requested and received by the storage system 26 before failure of the storage system 24. The error processing at the step 808 can be whatever is appropriate for the system, such as providing a message to a user and possibly logging the error. Following the step 808, processing is complete.

If it is determined at the test step 806 that the requested foreign key is received by the application from the storage system 26, then control transfers from the test step 806 to a step 812 where the application uses the foreign encryption key to access the encrypted data from the storage system 24 that had been replicated to the storage system 26. This is illustrated by the diagram 600 of FIG. 6, where the host 22' uses the key 402 to access the data 404' stored on the storage system. Following the step 812, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of failing over from a first storage system having data thereon that has been encrypted with a first encryption key to a second, separate, storage system having data thereon that has been encrypted with a second encryption key that is unrelated to the first encryption key, comprising:
   replicating data that is encrypted using the first encryption key from the first storage system to the second storage system prior to failover from the first storage system, wherein the data is inaccessible at the second storage system using the second encryption key and wherein the first encryption key is securely stored on the first storage system in a table that is encrypted with a third encryption key that is unrelated to at least the first encryption key;
   storing at the second storage system the data that is encrypted using the first encryption key;
   the second storage system requesting the first encryption key from the first storage system prior to failover from the first storage system;
   the first storage system determining if the second storage system is authorized for the first encryption key;
   the first storage system applying the third encryption key to the table at the first storage system to access the first encryption key and providing the first encryption key to the second storage system prior to failover from the first storage system in response to the second storage system being authorized;
   a host that is coupled to the second storage system requesting the first encryption key from the second storage system in response to receiving an indication that a failover has occurred; and
   the host accessing the data encrypted with the first encryption key at the second storage system only if the host is provided with the first encryption key by the second storage system.

2. A method, according to claim 1, wherein authorization is determined according to a manual configuration at a time of installation.

3. A method, according to claim 1, wherein authorization is determined according to heuristic rules.

4. A method, according to claim 3, wherein the heuristic rules include providing authorization storage systems that contain a replica of encrypted data from another storage system.

5. A method, according to claim 1, wherein the first and the second storage systems share registration tables.

6. Non-transitory computer readable media containing software that handled failing over from a first storage system having data thereon that has been encrypted with a first encryption key to a second, separate, storage system having data thereon that has been encrypted with a second encryption key that is unrelated to the first encryption key, the software comprising:
   executable code that replicates data that is encrypted using the first encryption key from the first storage system to the second storage system prior to failover from the first storage system, wherein the data is inaccessible at the second storage system using the second encryption key and wherein the first encryption key is securely stored on the first storage system in a table that is encrypted with a third encryption key that is unrelated to at least the first encryption key;

executable code that stores at the second storage system the data that is encrypted using the first encryption key;

executable code at second first storage system that requests the first encryption key from the first storage system prior to failover from the first storage system;

executable code at the first storage system that determines if the second storage system is authorized for the first encryption key;

executable code at the first storage system that applies the third encryption key to the table at the first storage system to access the first encryption key and provides the first encryption key to the second storage system prior to failover from the first storage system in response to the second storage system being authorized;

executable code at a host that is coupled to the second storage system and that requests the first encryption key from the second storage system in response to receiving an indication that a failover has occurred; and executable code at the host that accesses the data encrypted with the first encryption key at the second storage system only if the host is provided with the first encryption key by the second storage system.

7. Non-transitory computer readable media, according to claim 6, wherein authorization is determined according to a manual configuration at a time of installation.

8. Non-transitory computer readable media, according to claim 6, wherein authorization is determined according to heuristic rules.

9. Non-transitory computer readable media, according to claim 8, wherein the heuristic rules include providing authorization storage systems that contain a replica of encrypted data from another storage system.

10. Non-transitory computer readable media, according to claim 6, wherein the first and the second storage systems share registration tables.

11. A system that provides failover capability, comprising:
a first storage system having one or more physical storage units that store data that is encrypted using a first encryption key, wherein the first encryption key is securely stored in a table on the first storage system, the table being encrypted with a third encryption key that is unrelated to at least the first encryption key;
a second storage system coupled to the first storage system and having one or more physical data units that store data that is encrypted using a second encryption key that is unrelated to the first encryption key;
a first host coupled to the first storage system to exchange data therewith that is encrypted at the first storage system using the first encryption key, the data being decryptable using the first encryption key; and
a second host coupled to the second storage system, the second storage system receiving the encrypted data from the first storage system and storing the data that is encrypted using the first encryption key, wherein the data from the first storage system is inaccessible at the second storage system using the second encryption key, the second storage system and second host providing failover support for the first storage system and first host, wherein the second storage system requests the first encryption key, the first storage system applies the third encryption key to the table at the first storage system to access and provide the first encryption key and the second storage system receives the first encryption key from the first storage system prior to a failover from the first storage system in response to the first storage system determining that the second storage system is authorized for the first encryption key, and then the second host requests the first encryption key from the second storage system in response to receiving an indication that a failover has occurred and the second host accesses the data encrypted with the first encryption key at the second storage system only if the second host is provided with the first encryption key by the second storage system.

12. A system, according to claim 11, wherein authorization is determined according to a manual configuration at a time of installation.

13. A system, according to claim 11, wherein authorization is determined according to heuristic rules.

14. A system, according to claim 13, wherein the heuristic rules include providing authorization storage systems that contain a replica of encrypted data from another storage system.

15. A system, according to claim 11, wherein the first and the second storage systems share registration tables.

16. A method, according to claim 1, wherein at least one of the first encryption key and the second encryption key is a symmetric encryption key.

17. A method, according to claim 1, wherein at least one of the first encryption key and the second encryption key corresponds to a public/private asymmetric key pair.

18. Non-transitory computer readable media, according to claim 6, wherein at least one of the first encryption key and the second encryption key is a symmetric encryption key.

19. Non-transitory computer readable media, according to claim 6, wherein at least one of the first encryption key and the second encryption key corresponds to a public/private asymmetric key pair.

20. A system, according to claim 11, wherein at least one of the first encryption key and the second encryption key is a symmetric encryption key.

\* \* \* \* \*